United States Patent [19]
Doherty et al.

[11] Patent Number: 5,969,710
[45] Date of Patent: Oct. 19, 1999

[54] BIT-SPLITTING FOR PULSE WIDTH MODULATED SPATIAL LIGHT MODULATOR

[75] Inventors: Donald B. Doherty, Richardson; Carl W. Davis, McKinney; Joseph G. Egan, Garland, all of Tex.; Robert Gove, Los Gatos, Calif.

[73] Assignee: Texas Instruments Incorporated, Dallas, Tex.

[21] Appl. No.: 08/706,098

[22] Filed: Aug. 30, 1996

Related U.S. Application Data

[60] Provisional application No. 60/003,067, Aug. 31, 1995.

[51] Int. Cl.$^6$ .................................................. G09G 5/10
[52] U.S. Cl. ................................... 345/148; 345/147
[58] Field of Search .................................. 345/147, 148, 345/150, 151, 153

[56] References Cited

U.S. PATENT DOCUMENTS 5,278,652  1/1994  Urbanus et al. ........................ 345/200
5,497,172  3/1996  Doherty et al. ......................... 345/108

FOREIGN PATENT DOCUMENTS 0 507 270 A1  10/1992  European Pat. Off. .
0 685 830 A1  12/1995  European Pat. Off. .
WO 94/09473  4/1994  WIPO .

*Primary Examiner*—Matthew Luu
*Attorney, Agent, or Firm*—Charles A. Brill; Frederick J. Telecky, Jr.; Richard L. Donaldson

[57] ABSTRACT

A method of implementing pulse-width modulation in a display system (10, 20) that uses a spatial light modulator (SLM) (15) Each frame of data is divided into bit-planes, each bit-plane having one bit of data for each pixel of the SLM and representing a bit weight of the intensity value to be displayed by the pixels. Each bit-plane has a display time corresponding to a portion of the frame period, with bit-planes of more significant bits having longer portions. Then, the display times for one or more of the more significant bits are segmented so that the data for those bits can be displayed in segments rather than for a continuous time. (FIG. 3A). The segments are distributed throughout the frame period to reduce visual artifacts. (FIG. 3B).

15 Claims, 2 Drawing Sheets

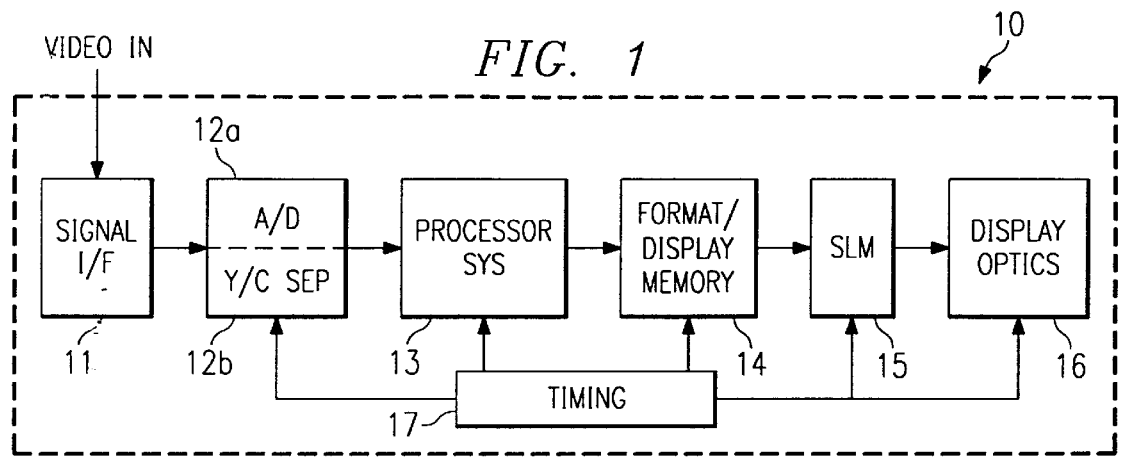
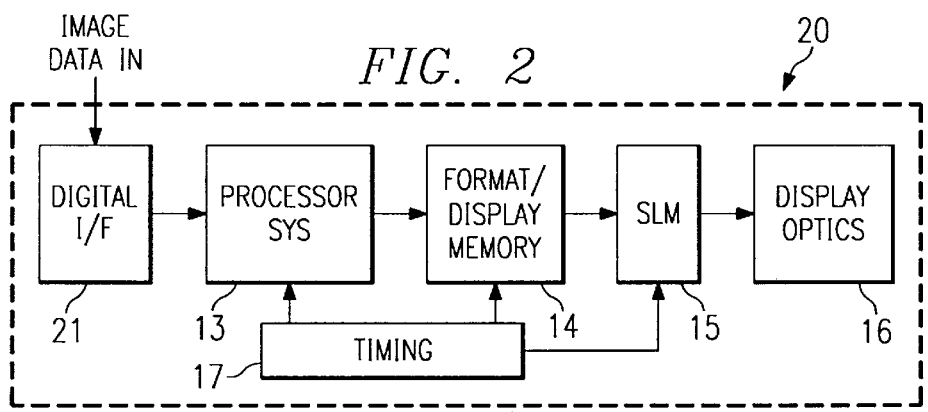
FIG. 3A
1/16 FRAME
MSB — MSB-1 — MSB-2
FRAME TIME
FIG. 3B
| 7 | 6 | 7 | 5 | 7 | 6 | 7 | 4 | 7 | 6 | 7 | 5 | 7 | 6 | 7 | 3 | 2 | 1 | 0 |
FRAME TIME

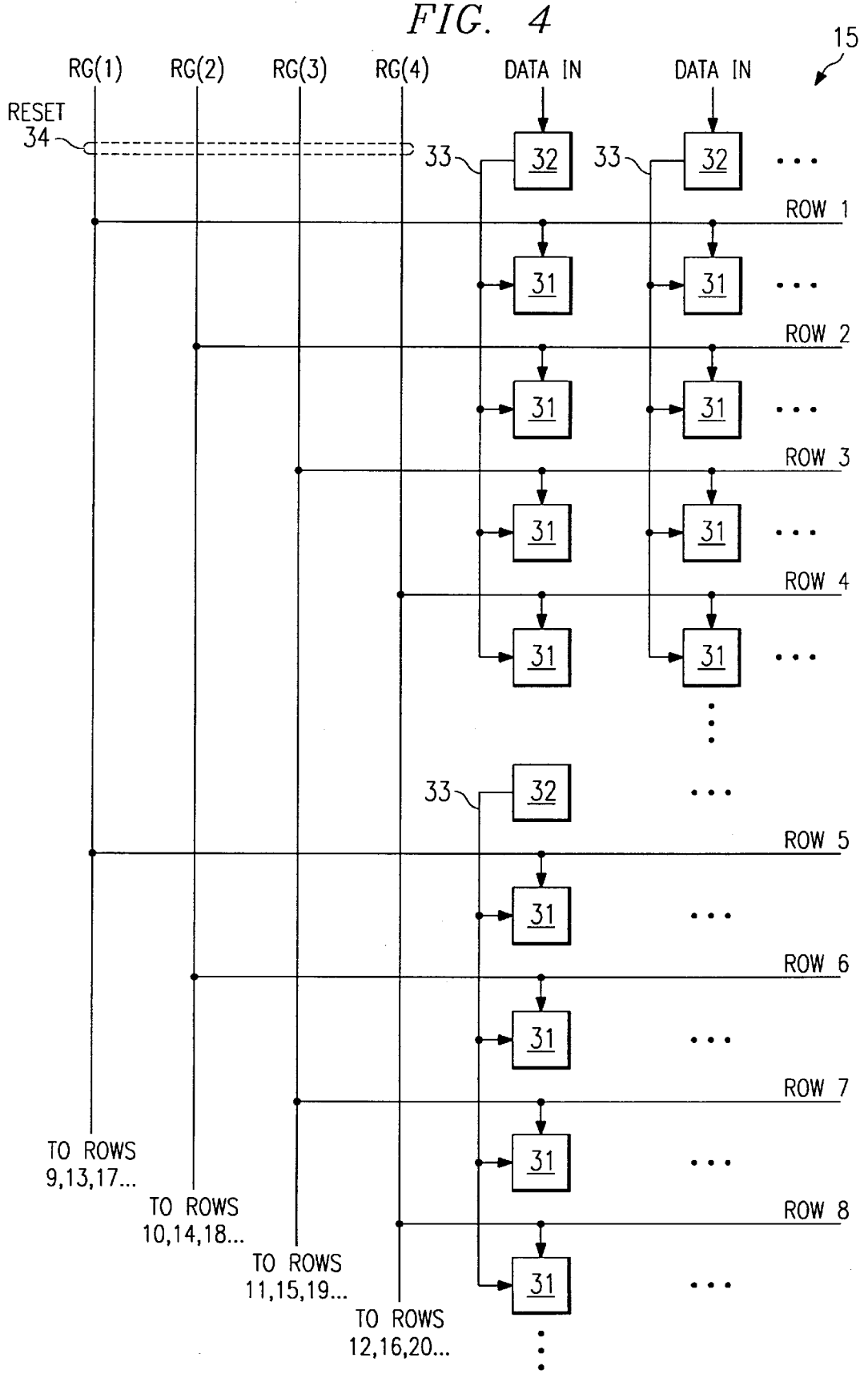

BIT-SPLITTING FOR PULSE WIDTH MODULATED SPATIAL LIGHT MODULATOR

This application claims priority under 35 U.S.C. §119 (e) (1) of provisional application No. Ser. 60/003,067, filed Aug. 31, 1995

TECHNICAL FIELD OF THE INVENTION

This invention relates to image display systems using spatial light modulators (SLMs), and more particularly to methods of displaying pixel data on the SLM.

BACKGROUND OF THE INVENTION

Video display systems based on spatial light modulators (SLMs) are increasingly being used as an alternative to display systems using cathode ray tubes (CRTs). SLM systems provide high resolution displays without the bulk and power consumption of CRT systems.

Digital micro-mirror devices (DMDs) are a type of SLM, and may be used for either direct-view or projection display applications. A DMD has an array of micro-mechanical pixels, each having a tiny mirror that is individually addressable by an electronic signal Depending on the state of its addressing signal, each mirror tilts so that it either does or does not reflect light to the image plane. The mirrors are often referred to as "pixels," to correspond to the pixels of the image that they generate. Generally, displaying pixel data is accomplished by loading memory cells connected to the pixels. The pixels can maintain their on or off state for controlled display times.

Other SLMs operate on similar principles, with an array of pixels that may emit or reflect light simultaneously, such that a complete image is generated by addressing pixels rather than by scanning a screen. Another example of an SLM is a liquid crystal display (LCD) having individually driven pixels.

To achieve intermediate levels of illumination, between white (on) and black (off), pulse-width modulation (PWM) techniques are used. The basic PWM scheme involves first determining the rate at which images are to be presented to the viewer. This establishes a frame rate and a corresponding frame period. For example, in a standard television system, images are transmitted at 30 frames per second, and each frame lasts for approximately 33.3 milliseconds. Then, the intensity resolution for each pixel is established. In a simple example, and assuming n bits of resolution, the frame time is divided into $2^n-1$ equal time slices. For a 33.3 millisecond frame period and n-bit intensity values, the time slice is $33.3/(2^n-1)$ milliseconds.

Having established these times, for each pixel of each frame, pixel intensities are quantized, such that black is 0 time slices, the intensity level represented by the LSB is 1 time slice, and maximum brightness is $2^n1$-time slices. Each pixel's quantized intensity determines its on-time during a frame period. Thus, during a frame period, each pixel with a quantized value of more than 0 is on for the number of time slices that correspond to its intensity. The viewer's eye integrates the pixel brightness so that the image appears the same as if it were generated with analog levels of light.

For addressing SLMs, PWM calls for the data to be formatted into "bit-planes," each bit-plane corresponding to a bit weight of the intensity value. Thus, if each pixel's intensity is represented by an n-bit value, each frame of data has n bit-planes. Each bit-plane has a 0 or 1 value for each pixel. In the simple PWM example described in the preceding paragraphs, during a frame, each bit-plane is separately loaded and the pixels addressed according to their associated bit-plane values. For example, the bit-plane representing the LSBs of each pixel is displayed for 1 time slice, whereas the bit-plane representing the MSBs is displayed for 2n/2 time slices. Because a time slice is only $33.3/(2^n-1)$ milliseconds, the SLM must be capable of loading the LSB bit-plane within that time. The time for loading the LSB bit-plane is the "peak data rate."

U.S. Pat. No. 5278,652, entitled "DMD Architecture and Timing for Use in a Pulse-Width Modulated Display System," assigned to Texas Instruments Incorporated describes various methods of addressing a DMD in a DMD-based display system. These methods are directed to reducing the peak data rate while maintaining optical efficiency. Some of the methods discussed therein include clearing blocks of pixel elements and using extra "off" times to load data. In one method the time in which the most significant bit is displayed is broken into smaller segments so as to permit loading for less significant bits to occur during these segments.

Another method of reducing the peak data rate is referred to as "memory multiplexing" or "split reset." This method uses a specially configured SLM, whose pixels are grouped into reset groups that are separately loaded and addressed. This reduces the amount of data to be loaded during any one times and permits the LSB data for each reset group to be loaded at a different time during the frame period. This configuration is described in U.S. patent Ser. No. 08/002,627 assigned to Texas Instruments Incorporated.

Regardless of whether or not the pixels of the SLM are addressed all at once or are multiplexed, the resulting display must have minimal visual artifacts. A type of artifact that is possible with bit-plane data is "temporal contouring." As an example, for an 8-bit system, if in one frame, a pixel has an intensity level of 128 and the MSB display time occurs during the first half of the frame time, the pixel is on for this length of time and off for the rest of the frame time. If, in the next frame, the pixel's intensity is 127, the pixel is off for the MSB time and on during the display time for all other bits during that frame. The point in time when all bits change state can cause a visual artifact, which is more perceptible as brightness increases.

SUMMARY OF THE INVENTION

One aspect of the invention is a method of displaying pixel data on a spatial light modulator having individually addressable pixels, for a pulse width modulated display. The data is received as a series of frames of data. This data is formatted into bit-planes, each bit-plane having one bit of data for each pixel. Each bit-plane represents a bit-weight of intensity values to be displayed by the pixels, and each bit-plane has a display time corresponding to its bit-weight. The display times of bit-planes of one or more of the more significant bit-weights are segmented into smaller display times. Each segment has the same bit-plane data but is displayed for a portion of the total display time for that bit-plane. Within each frame, the display times of the segments are distributed throughout the period of that frame. In effect, the method re-addresses the SLM with the same bit-plane data but for shorter display times that are distributed in the frame period with data of other bit-planes.

A technical advantage of the invention is that it reduces visual artifacts that may be perceptible with other pulse width modulation methods.

BRIEF DESCRIPTION OF THE DRAWINGS

FIGS. 1 and 2 are block diagrams of image display systems, each having an SLM that displays data in accordance with the invention.

FIGS. 3A and 3B illustrate how data is displayed in accordance with the invention.

FIG. 4 illustrates the SLM of FIG. 1 or FIG. 2, configured for memory multiplexed (split reset) addressing.

DETAILED DESCRIPTION OF THE INVENTION

Overview of SLM Display Systems Using PWM

A comprehensive description of a DMD-based digital display system is set out in U.S. Pat. No. 5,079,544, entitled "Standard Independent Digitized Video System," and in U.S. patent Ser. No. 08/147,249, entitled "Digital Television System," and in U.S. patent Ser. No. 08/146,385, entitled "DMD Display System." Each of these patents and patent applications is assigned to Texas Instruments Incorporated, and each is incorporated by reference herein. An overview of such systems is discussed below in connection with FIGS. 1 and 2.

FIG. 1 is a block diagram of a projection display system 10, which uses an SLM 15 to generate real-time images from an analog video signal, such as a broadcast television signal. FIG. 2 is a block diagram of a similar system 20, in which the input signal already represents digital data. In both FIGS. 1 and 2, only those components significant to main-screen pixel data processing are shown. Other components, such as might be used for processing synchronization and audio signals or secondary screen features, such as closed captioning, are not shown.

Signal interface unit 11 receives an analog video signal and separates video, synchronization, and audio signals. It delivers the video signal to A/D converter 12a and Y/C separator 12b, which convert the data into pixel-data samples and which separate the luminance ("Y") data from the chrominance ("C") data, respectively. In FIG. 1, the signal is converted to digital data before Y/C separation, but in other embodiments, Y/C separation could be performed before A/D conversion, using analog filters.

Processor system 13 prepares the data for display, by performing various pixel data processing tasks. Processor system 13 includes whatever processing memory is useful for such tasks, such as field and line buffers. The tasks performed by processor system 13 may include linearization (to compensate for gamma correction), colorspace conversion, and line generation. The order in which these tasks are performed may vary.

Display memory 14 receives processed pixel data from processor system 13. It formats the data, on input or on output, into "bit-plane" format, and delivers the bit-planes to SLM 15 one at a time. As disclosed in the Background, the bit-plane format permits each pixel of SLM 15 to be turned on or off in response to the value of 1 bit of data at a time. In the example of this description, this formatting is performed by hardware associated with display memory 14. However, in other embodiments, the formatting could be performed by processor system 13 or by dedicated formatting hardware in the data path before or after display memory 14.

In a typical display system 10, display memory 14 is a "double buffer" memory, which means that it has a capacity for at least two display frames. The buffer for one display frame can be read out to SLM 15 while the buffer another display frame is being written. The two buffers are controlled in a "ping-pong" manner so that data is continuously available to SLM 15.

The bit-plane data from display memory 14 is delivered to SLM 15. As explained below, the bit-planes of the more significant bits are loaded more than once so that these bit-planes can be displayed in segments. This segmented loading can be accomplished by re-addressing a bit-plane of data in display-memory 14 each time a segment of that bit-plane is to be displayed.

Although this description is in terms of a DMD-type of SLM 15, other types of SLMs could be substituted into display system 10 and used for the invention described herein. For example, SLM 15 could be an LCD-type SLM. Details of a suitable SLM 15 are set out in U.S. Pat. No. 4,956,619, entitled "Spatial Light Modulator," which is assigned to Texas Instruments Incorporated and incorporated by reference herein. Essentially, DMD 15 uses the data from display memory 14 to address each pixel of its pixel array. The "on" or "off" state of each pixel forms an image.

Display optics unit 16 has optical components for receiving the image from SLM 15 and for illuminating an image plane such as a display screen. For color displays, the display optics unit could include a color wheel, and bit-planes for each color could be sequenced and synchronized to the color wheel. Or, the data for different colors could be concurrently displayed on three SLMs and combined by display optics unit 16. Master timing unit 17 provides various system control functions.

Bit-Splitting

One aspect of the invention is the recognition that PWM can result in visual artifacts, which can be avoided by modifications to the sequence in which data is displayed. As described in the Background, temporal contouring is caused by changes in intensity, especially when the state of the more significant bits change.

FIGS. 3A and 3B illustrate a "bit-splitting" method used to avoid temporal contouring. First, as shown in FIG. 3A, the display times of the bit-planes of the more significant bits are divided into smaller segments. For example, for a frame period having 255 time slices and 8-bit pixel values, the bit-plane data for the MSB (bit-plane 7) has a display time (during which each pixel is on or off) of 128 time slices (about ½ the total frame time). When the display time for the MSB is divided into segments, each segment contains an integer number of these 128 time slices. Typically, the segments are of equal duration, but this is not necessary. In FIG. 3A, the MSB bit-plane display time is divided into 8 equal segments. Similarly, display times for the MSB-1 bit-plane (bit-plane 6) and the MSB-2 bit-plane (bit-plane 5) are divided into smaller time periods. More specifically, the display time for MSB-1 bit-plane is divided into four segments, and the display time for the MSB-2 bit-plane is divided into two segments. The bit-planes selected for segmentation could be any one or more of the bit-planes other than that of the LSB.

Next, as illustrated in FIG. 3B, the display times for the segments are distributed throughout the frame period. The distribution is substantially uniform across the frame period. For example, in FIG. 3B, the 8 segments of the MSB (bit 7) display time are separated by the display times for bits 6–4. The display times for bits 3–0 occur together at the end of the frame.

Many other combinations of splitting and distributing bit-planes are possible. By experimentation, it is believed that limiting display times to no more than $\frac{1}{16}$ to total frame time effectively reduces artifacts For 8-bit pixel data, this results in the 8,4,2,1,1,1,1,1 segmentation illustrated in FIG. 3B. An alternative segmentation method that yields good results uses an 8,4,2,2,1,1,1,1 pattern, in which bit-plane 4 is split into two segments half the size of those of bit-planes 7–5. The smaller the segments, the more times data is required to be loaded to the SLM, which imposes a bandwidth constraint on the number of segments. In general, the distribution is sufficiently uniform so as to minimize the effects of intensity changes. Thus, the segments of the MSB are separated by display times of segments of other bits.

As stated above, SLM display systems 10 or 20 may provide color either by sequential display of data for each color via a color wheel or by concurrently displaying data for each color with three SLMs. When a color wheel is used, the frame time is divided into three parts, one part for each color. For a color wheel system, the bit-splitting method described above may be used, with the "frame-time" being equivalent to the part of the frame time assigned to each color. However, in a color wheel system, because display times are shorter, the display is less prone to artifacts. As compared to a multi-chip color system of the same brightness, a color wheel system requires fewer segments. A bit-splitting method that uses a 3,2,1,1,1,1,1,1 pattern, uniformly distributed, may be suitable for a color wheel system.

Split Reset Addressing

FIG. 4 illustrates a portion of the pixel array of SLM 15, configured for split-reset addressing. Only a small number of pixels 31 and their related memory cells 32 are explicitly shown, but as indicated, SLM 15 has additional rows and columns of pixels 31 and memory cells 32. A typical SLM 15 has hundreds or thousands of such pixels 31.

In the example of FIG. 4, sets of four pixels 31 share a memory cell 32. this divides SLM 15 into four reset groups of pixels 31. The reset groups are divided "horizontally" in the sense that every fourth line of pixels 31 belongs to a different reset group.

The data for these reset groups is formatted into reset group data. Thus, where p is the number of pixels and q is the number of reset groups, a bit-plane having p number of bits is formatted into a reset group having p/q bits of data.

U.S. patent Ser. No. 08/002,627, entitled "Pixel Control Circuitry for Spatial Light Modulator," assigned to Texas Instruments Incorporated and incorporated by reference herein, describes split-reset data loading and addressing for a DMD. These concepts are applicable to SLMs in general.

The switching of the pixels from on to off is controlled by loading their memory cells 32 with a bit of data and applying a voltage indicated by that bit to address electrodes connected to the pixels 31 via address lines 33. In other words, for each set of four pixels 31, either 1 or a 0 data value is delivered to their memory cell 32, and applied to these pixels 31 as a "+" or "−"voltage. Signals on the reset lines 34 determine which pixel 31 in that set will change state.

One aspect of split-reset addressing is that only a subset of the entire SLM array is loaded at one time. In other words, instead of loading an entire bit-plane at once, the loading for reset groups of that bit-plane's data occurs at different times within the frame period. An entire reset group can be controlled by a common signal on its reset lines 34. Once all memory cells 32 for the pixels 31 of a particular reset group have been loaded, the reset lines 34 provide a reset signal to cause the states of those pixels 31 to change in accordance with the data in their associated memory cells 32.

The bit-splitting method of the invention can be applied to split-reset SLMs. As described above, the data is formatted into bit-planes. The bit-planes are further formatted into reset-groups so that the data can be delivered in a desired sequence to the SLM 15. Within each reset group, the display times of its bit-planes can be split and distributed as described above.

As an example, and using the pattern of FIG. 3B modified for four reset groups (a–d), the data for a frame might be displayed in the following order:

bit-plane 7, reset group a, segment 1

. . .

bit-plane 7, reset group d, segment 1
bit-plane 6, reset group a, segment 1

. . .

bit-plane 7, reset group a, segment 2

. . .

bit-plane 5, reset group a, segment 1

. . .

bit-plane 3, reset group a

. . .

bit-plane 0, reset group d

In a concurrent color (multi-SLM) system, the same pattern would be used for each color. However, in a sequential color (color wheel) system, the above pattern could be the same, or varied, for each color.

Dynamic Bit-Splitting

An enhancement of the invention is to vary the bit-splitting pattern depending on the content of the image. When motion or intensity changes occur in the image, the bit-splitting can be implemented, perhaps with only the more significant bits being displayed to ameliorate the increased bandwidth requirements. Fore example, during these images, only the 6 MSBs of 8-bit data might be displayed, but with high segmentation and distribution of bit-plane data. Various known motion and intensity detection methods can be used to control the dynamic bits-splitting.

In a sequential color (color wheel) system, these dynamic changes could be implemented for each color. For example, a high intensity color might call for more bit-splitting than a less intense color.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of displaying pixel data by a spatial light modulator (SLM) having individually addressable pixels, using pulse width modulation, the data being received as a series of frames of data one data word per component color per pixel per frame, said method comprising the steps of:

formatting each said frame of data into bit-planes, each said bit-plane having one bit of data for each of said pixels, each said bit-plane representing a bit-weight of intensity values to be displayed by the pixels, and each said bit-plane having a display time corresponding to its bit-weight;

dividing into equal-length segments the display times of said bit-planes of one or more of more significant bit-weights such that each segment is no greater than one-sixteenth the total length of all said bit-planes for said data word, and distributing the display times of said segments of one said frame throughout the period of that frame.

2. The method of claim 1, further comprising the step of dividing the period of said frame into equal time slices, and wherein said formatting step is performed by allocating a number of said time slices to each said bit-plane, proportional to that bit-plane's bit-weight.

3. The method of claim 1, wherein all said segments have equal display times.

4. The method of claim 1, wherein all said segments of any one said bit-plane have equal display times.

5. The method of claim 1, further comprising the step of sub-formatting said bitplanes into reset groups, each said reset group having data for a group of said pixels to be loaded to said SLM at a different time from other of said pixels, and wherein a segmenting step is performed such that the display times of said bit-planes of said reset groups are segmented.

6. The method of claim 1 wherein said segmenting step is preceded by the step of detecting motion in said pixel data, and wherein the performance of said segmenting and distributing steps depends on the results of said detecting step.

7. The method of claim 6, further comprising the step of eliminating the display times for one or more of less significant bit-weights.

8. The method of claim 1, wherein said segmenting step is preceded by the step of detecting intensity in said pixel data, and wherein the performance of said segmenting and distributing steps depends on the results of said detecting step.

9. The method of claim 8, further comprising the step of eliminating the display times for one or more of less significant bit-weights.

10. The method of claim 1, wherein said display is a sequential color display, and wherein each of several colors is displayed for a portion of said frame, such that said formatting and segmenting steps are performed on data for each said color and said distributing step is performed within said portion.

11. The method of claim 1, wherein said distributing step is performed such that said segments are substantially uniformly distributed.

12. A display system for improved display of images from frames of pixel data, using a spatial light modulator (SLM), comprising:

a data formatter operable to format each said frame of pixel data into bit-planes, each said frame of pixel data comprising one data word per component color per pixel per frame each said bit-plane having one bit of data for each of said pixels, each said bit-plane representing a bit weight of an intensity value to be displayed by the pixels, and each said bit-plane having a display time corresponding to its bit-weight;

a display memory capable of storing said bit-planes and delivering said bit-planes to said SLM, such that said bit-planes of one or more of the more significant bit-weights are delivered to said SLM multiple times during the period of the frame corresponding to that bit-plane, wherein said multiple times; and a spatial light modulator upon which are displayed said bit-planes, with the display times of said one or more of the more significant of said bit-planes occurring as said data is delivered from said display memory, such that said one or more of the more significant of said bit-planes are segmented and distributed throughout said period of said frame, each segmented portion of said one or more of the more significant of said bit-planes displayed for no more than one-sixteenth of the display period for said data word.

13. The display system of claim 12, wherein said data formatter is a processor.

14. The display system of claim 12, wherein said data formatter is circuitry of said display memory.

15. The display system of claim 12, wherein said SLM is a memory multiplexed SLM, and wherein said data formatter sub-formats said bit-planes into reset groups, each said reset group having said data for a group of said pixels to be loaded to said SLM at a different time from other of said pixels, such that said SLM segments the display times of said bit-planes of said reset groups.

* * * * *